G. B. BOOMER, T. G. MORSE, & R. E. BOSCHERT.

Cheese-Presses.

No. 5,256. Reissued Jan. 28, 1873.

Witnesses.

Chas. G. Henderson

Edmund Masson.

Inventors

Geo. B. Boomer, Thos. G. Morse & Rufus E. Boschert.

By their Attorney, A. B. Stoughton.

AM. PHOTO-LITHOGRAPHIC CO. N.Y. (OSBORNE'S PROCESS.)

UNITED STATES PATENT OFFICE.

GEORGE B. BOOMER, OF SYRACUSE, NEW YORK, THOMAS G. MORSE, OF ERIE, PENNSYLVANIA, AND RUFUS E. BOSCHERT, OF SYRACUSE, NEW YORK; SAID MORSE ASSIGNOR TO SAID BOOMER.

IMPROVEMENT IN CHEESE-PRESSES.

Specification forming part of Letters Patent No. 108,753, dated November 1, 1870; reissue No. 5,256, dated January 28, 1873.

*To all whom it may concern:*

Be it known that we, GEORGE B. BOOMER, now of Syracuse, New York, THOMAS G. MORSE, of Erie, Pennsylvania, and RUFUS E. BOSCHERT, of Syracuse, New York, all formerly of Phœnix, New York, have invented a new and useful Improvement in Cheese-Presses; and we do hereby declare that the following is a full, clear, and exact description thereof, which will enable others to make and use the same, reference being had to the accompanying drawing forming a part of this specification, in which—

Figure 1:
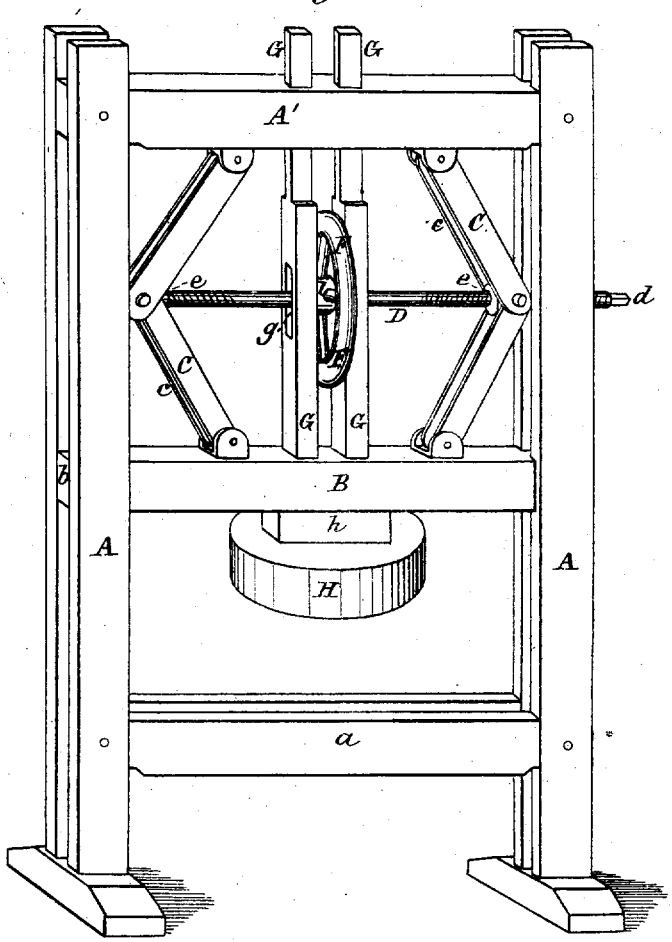
Figure 2:
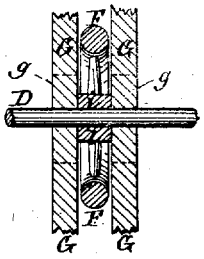

Figure 1 represents a perspective view of the press. Fig. 2 represents a section through the standards and the hub of the wheel on the screw-shaft, to show how the screw-shaft is sustained by the standards.

Our invention relates to the construction of a press in which sliding standards connected to the follower or platen of the press are guided and sustained in or against the frame of the press, and a double or right-and-left-hand screw-shaft is sustained in or against the sliding standards, thus keeping the power and strain of the press in a right line, and avoiding all cramping or warping of the parts, and adding to the power and durability of the press.

To enable others skilled in the art to make and use our invention, we will proceed to describe the same with reference to the drawing.

A represents the frame of the press. B is the follower, or platen-brace, or beam, and C are the links of knee or toggle-joint levers, that are actuated by a shaft, D, having a right-and-left-hand screw cut upon it to work the follower or platen of the press and its connected parts. The frame-work A is made double, so as to form slots between the main uprights; and the follower-beam or brace B is made with tenons *b b* at its ends, which move in or against the frame of the press, so as to guide, brace, and sustain the follower in a true position when working. The knee or toggle-lever links C are also made double, for strength, and the nuts *e e*, that connect the links with the screw-shaft, are placed between and held by them. The follower beam or brace B has two upright projections or standards, G G, fixed rigidly to it, and these pieces pass up through mortises in the cross-piece A′ of the frame, and act as guides to steady and control any lateral thrust of the follower H, and its brace or beam B, which also aids to keep the follower in its proper working position. The upper ends of the links or toggle-arms C are stationary, or have a fixed fulcrum on the cross or head piece A′ of the frame, and the lower ends of the links or toggle-arms are pivoted to the follower beam or brace B, so that by spreading the toggle-arms, or bringing said arms into a vertical position, the follower and its brace-beam are raised or lowered, as the case may be. The screw-shaft D is sustained in and carried by the toggle-arms or levers C, and, of course, must rise and fall, or move, with said toggle-arms; but the movement of the screw-shaft will not be to the same extent as that of the follower or its brace, and the standards, which, being all attached, may be regarded as one piece; and to provide for this differential movement, the standards have vertical slots, as at *g*, so that the standards and their attached parts may move independent of the vertical movement of the screw-shaft, the latter only moving about half the distance that the follower and standards move.

It will be perceived that the standards and the follower are braced to or in the press-frame at two points—one above and the other at some distance below—so that they must move in a line as unvarying as that of the press-frame itself; and that the screw-shaft may also preserve its proper working position, which is in a plane at right angles to the plane of the follower, the hub *i* of the lever-wheel F works against the inner faces of the standards G, and so steadies and keeps said shaft in its true working position; and by so guiding and sustaining the follower in the press-frame, and the screw-shaft in the standards of the follower, the power of the press is always in a true plane in the line of the follower, and not thrown off laterally against the frame, which not only detracts from its power, but ruins the threads of the screw-shaft, and destroys the press.

The press can be run down at first by a crank applied to the screw-shaft, at *d*, but it cannot be used toward the latter end of the operation, as from the vertical movement of the screw-shaft, and the inward movement of the nut through which it works, and by which it is supported, the screw-shaft would be liable to be broken by the use of the crank, under heavy strain, when its nut-support was so far removed from the crank. The press is worked mainly by a hand or lever-wheel, F, fixed to the shaft at its center, and between the guiding-standards G, and so snugly fitted in between them by its hub, boss, or central portion, as to prevent any and all endwise play of the screw-shaft, which, if allowed, would depress one end of the beam or brace and side of the follower more than the other, and make the guides bind, and throw the strain and power of the press out of line, as above stated.

The follower H is fastened firmly to the brace-beam B, and a blocking, *h*, may be used in connection with it when the thing to be pressed may need such interposed blocking.

The ends of the links C can be pivoted to the sides of the beams B A′, instead of resting in the metallic shoes; and the press, by this means, may be shortened up nearly a foot, if desired.

What we claim, is—

In combination with the sliding standards, supported laterally and guided in the frame of the press, the double screw-shaft supported in or against the sliding standards, substantially as and for the purpose described.

GEORGE B. BOOMER.
THOMAS G. MORSE.
RUFUS E. BOSCHERT.

Witnesses:
CH. VTREUBER,
JACOB F. WALTHER.